(12) United States Patent
Slovetskiy

(10) Patent No.: US 11,089,065 B2
(45) Date of Patent: Aug. 10, 2021

(54) EFFICIENT INTERACTIONS TO SUPPORT INTERNET-OF-THINGS (IOT) DEVICE POWER SAVING MODE

(71) Applicant: T-Mobile USA, Inc., Bellevue, WA (US)

(72) Inventor: Sergey Slovetskiy, Bellevue, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/850,906

(22) Filed: Apr. 16, 2020

(65) Prior Publication Data
US 2021/0067565 A1 Mar. 4, 2021

Related U.S. Application Data

(60) Provisional application No. 62/894,543, filed on Aug. 30, 2019.

(51) Int. Cl.
*H04L 29/06* (2006.01)
*H04W 4/70* (2018.01)
(Continued)

(52) U.S. Cl.
CPC ...... *H04L 65/1016* (2013.01); *H04L 65/1006* (2013.01); *H04W 4/70* (2018.02);
(Continued)

(58) Field of Classification Search
CPC . H04L 65/1016; H04L 65/1006; H04L 69/08; H04L 67/2842; H04W 4/70; H04W 76/10; H04W 8/08; H04W 36/14; H04W 68/005; H04W 88/06; H04W 52/0216; H04W 8/02
See application file for complete search history.

(56) References Cited

U.S. PATENT DOCUMENTS

2017/0164286 A1 6/2017 Jeong et al.
2020/0389515 A1* 12/2020 Hande ............... H04L 1/1628

OTHER PUBLICATIONS

European Patent Application No. 20189359.1, Extended European Search Report dated Jan. 20, 2021, 10 pages.
(Continued)

*Primary Examiner* — Diane D Mizrahi
(74) *Attorney, Agent, or Firm* — Han Santos, PLLC

(57) ABSTRACT

A 3$^{rd}$ Generation Partnership Project (3GPP) notification message may be received at a translation application at a core network of a wireless carrier network. The 3GPP notification message may include an indication of a loss of connectivity or a communication failure for an Internet-of-Things (IoT) device. The 3GPP notification message is translated by the translation application into a logically equivalent non-3GPP reachability status communication that indicates the IoT device is unreachable. The non-3GPP reachability status communication is sent by the translation application to a server of the wireless carrier network to trigger the server to queue one or more communication messages that are destined for the IoT device in a server queue. Likewise, another 3GPP notification message may be translated into an additional non-3GPP reachability status communication that causes the release of the one or more communication messages to the IoT device.

20 Claims, 10 Drawing Sheets

(51) Int. Cl.
  *H04W 76/10* (2018.01)
  *H04W 8/08* (2009.01)
  *H04W 36/14* (2009.01)
  *H04W 68/00* (2009.01)
  *H04W 88/06* (2009.01)

(52) U.S. Cl.
  CPC ............. *H04W 8/08* (2013.01); *H04W 36/14* (2013.01); *H04W 68/005* (2013.01); *H04W 76/10* (2018.02); *H04W 88/06* (2013.01)

(56) References Cited

OTHER PUBLICATIONS

Huawei et al: "Solution for Key Issue 2 Reliable delivery of data between UE and SCEF using existing standards", 3GPP Draft; S2-165224 WAS 5215 WAS 4897 WAS 4824 WAS 4339—3rd Generation Partnership Project (3GPP),Mobile Competence Centre, 650, ROU, vol. SA WG2, No. Sanya, China; Aug. 29, 2016-Sep. 2, 2016 Sep. 3, 2016 (Sep. 3, 2016), XP051172149, Retrieved from the Internet: URL:http://www.3gpp.org/ftp/tsg sa/WG2 Arch/TSGS2 116BIS Sanya/Docs/ [retrieved on Sep. 3, 2016]* the whole document*.

Huawei et al: Data buffering for UE in PSM mode, 3GPP Draft; S2-166711—Discussion on Data Buffering for PSM, 3rd Generation Partnership Project (3GPP), Mobile Competence Centre; 650, Route Des Lucioles; F-06921 Sophia-Antipolis Cedex; France vol. SA WG2, No. Reno, Nevada, USA; Nov. 14, 2016-Nov. 18, 2016 Nov. 14, 2016 (Nov. 14, 2016), XP051185263, Retrieved from the Internet: URL:http://www.3gpp.org/ftp/Meetings 3GPP SYNC/SA2/ Docs/ [retrieved on Nov. 14, 2016]* the whole document*.

\* cited by examiner

EFFICIENT INTERACTIONS TO SUPPORT INTERNET-OF-THINGS (IOT) DEVICE POWER SAVING MODE

CROSS-REFERENCE TO RELATED PATENT APPLICATION

This application claims priority to U.S. Provisional Patent Application No. 62/894,543, filed on Aug. 30, 2019, entitled "Efficient Interaction to Support IoT Power Saving Mode" which is hereby incorporated by reference in its entirety.

BACKGROUND

Power constrained Internet-of-Things (IoT) devices that conform to the $3^{rd}$ Generation Partnership Project (3GPP) Narrow Band (NB)-IoT 5G standards are equipped with a power saving mode (PSM) that allows the IoT devices to "sleep" for significant amounts of time to prolong battery life. When an IoT device wakes up, the IoT device may notify a core network of a wireless carrier network of its active state by sending a 3GPP defined "User Equipment (UE) Reachability Notification" message to a Service Capability Exposure Function (SCEF) or an equivalent Network Exposure Function (NEF) of the core network.

Additionally, the Lightweight Machine-to-Machine (LwM2M) standards and the underlying Constrained Application Protocol (CoAP) protocols can also be used for device management, data delivery, and general data communication for IoT devices. For example, the LwM2M standards specify that when an IoT device is asleep, incoming communication messages destined for the device are queued in an LwM2M server queue. Further, when the IoT device wakes up, the device may signal its active state by sending an "LwM2M Registration Update" message or a "CoAP Registration" message that causes the communication messages to be released from the LwM2M server queue or a CoAP server queue, as well as delivered to the IoT device.

However, the sending of such LwM2M requires considerably more power than the sending of the 3GPP defined "UE reachability Notification" messages. This is because the use of the 3GPP messages does not require the IoT device to establish communication with an LwM2M server using a Datagram Transport Layer Security (DTLS)/Transport Layer Security (TLS) handshake and/or RESTful CoAP communication messages. In other words, the use of the 3GPP messages does not require an IoT device to poll the LwM2M server, which may become a wasteful operation if there are no messages queued in the LwM2M server queue for the IoT device. Further, there is also a disconnect between the PSM and the wake-up operations of the IoT devices as specified by 3GPP standards and the LwM2Ms.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
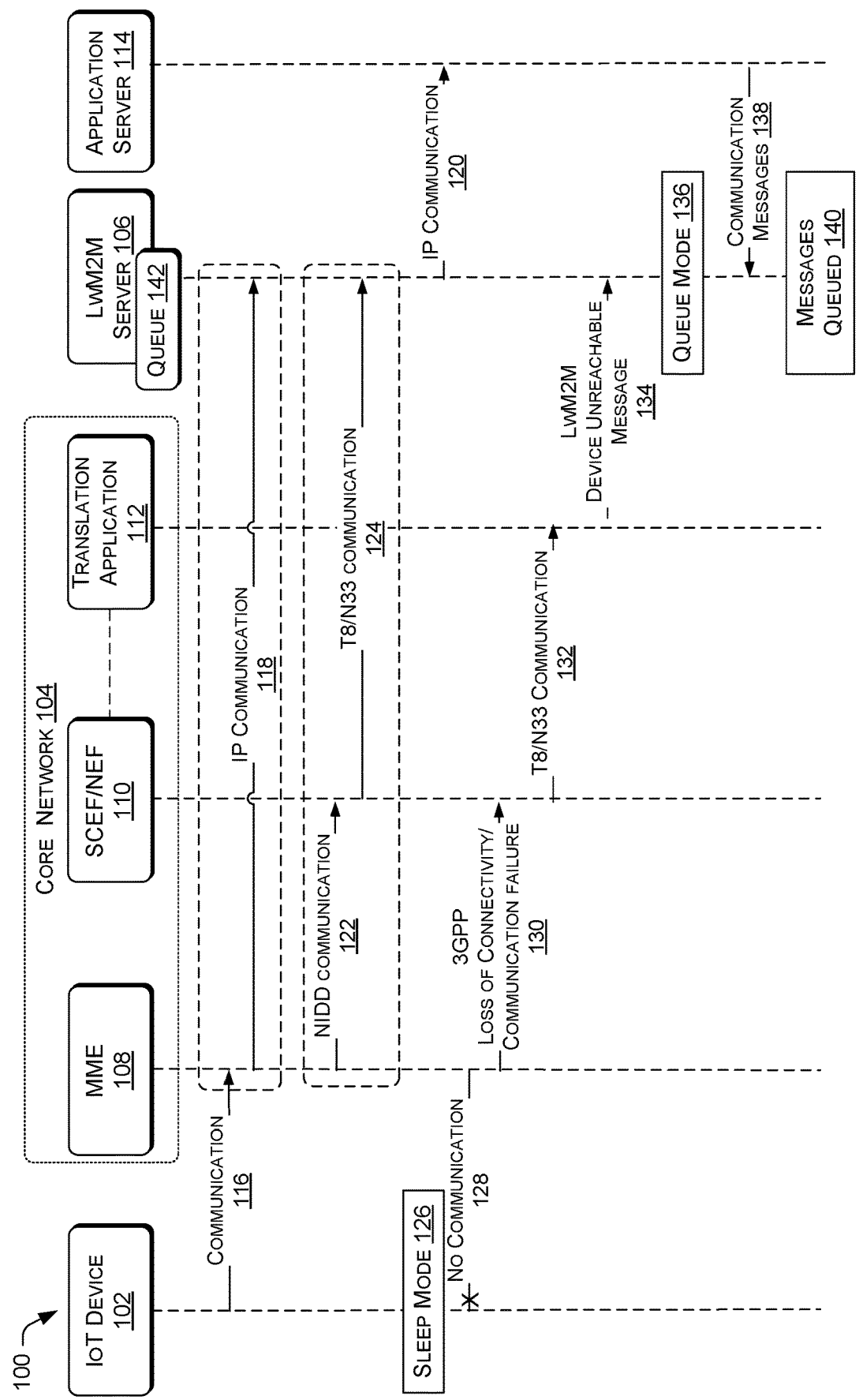
FIG. 1 illustrates an example protocol flow for using a 3GPP message that indicates loss of connectivity or communication failure to trigger a queuing of messages by an LwM2M server following an IoT device going into a sleep mode.

This disclosure is directed to techniques that enable a core network of a wireless carrier network to translate incoming 3GPP sleep and wake messages from an IoT device into LwM2M messages for an LwM2M server. The translated LwM2M messages may be used to trigger the LwM2M server to queue and release communication messages that are destined for the IoT device. In some embodiments, a translation application that is associated with the core network may translate the incoming 3GPP sleep and wake messages into LwM2M messages.

For example, the translation application may convert a 3GPP UE Reachability Notification message that indicates a loss of connectivity or a communication failure for the IoT device into an LwM2M Reachability Indication message that indicates that the IoT device is unreachable. Such an LwM2M Reachability Indication message may trigger the LwM2M server to queue one or more communication messages from an application server that are destined for the IoT device into an LwM2M server queue as the device is in a PSM.

In another example, the translation application may convert another 3GPP Reachability notification message that indicates UE reachability or availability after Downlink Data Notification (DDN) failure for the IoT device into an LwM2M Registration Update message or an additional LwM2M Reachability Indication message that indicates the IoT device is reachable. This LwM2M Registration Update message or the additional LwM2M Reachability Indication message may trigger the LwM2M server to release the one or more queued communication messages from the LwM2M server queue.

In other embodiments, the release of the one or more queued messages from the LwM2M server queue may be initiated by other network communications sent to the core network from the IoT device. The IoT device may send these other network communications when the IoT device is awake. Such network communications may include certain LwM2M messages, CoAP messages, DTLs communication messages, and/or network packets, such as Internet Protocol (IP) packets, User Datagram Protocol (UDP) packets, or Transmission Control Protocol (TCP) packets.

In alternative implementations, the LwM2M server may be substituted with a CoAP server, and the LwM2M server queue may be substituted with a CoAP server queue, in which the CoAP server is implemented with the same logic as the LwM2M server. In such implementations, the translation application may convert the 3GPP messages into CoAP messages that are equivalent to the LwM2M messages.

The translation and use of 3GPP messages to trigger the LwM2M server to queue and release messages that are destined for the IoT device may provide several benefits. For example, because power-constrained IoT devices have limited battery life, the use of the less energy-intensive 3GPP messages to notify the LwM2M server to queue and release messages for the IoT device may increase the operational longevity of the IoT device. Further, because IoT devices are generally configured to send 3GPP messages more often than LwM2M messages, e.g., every tens of minutes instead of hours, the amount of time that the IoT devices are incommunicado and unable to receive queued messages from the LwM2M server may be reduced. The techniques described herein may be implemented in a number of ways. Example implementations are provided below with reference to the following figures.

Example Network Architecture

FIG. 1 illustrates an example protocol flow 100 for using a 3GPP message that indicates loss of connectivity or communication failure to trigger a queuing of messages by an LwM2M server following an IoT device going into a sleep mode. The example protocol flow may be implemented by a wireless carrier network. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 4G, 5G, NB-IoT, and/or so forth.

The network architecture of a wireless carrier network may include base station nodes and a core network 104. The base station nodes are responsible for handling voice and data traffic between user devices, such as the IoT device 102, and the core network 104 via air interfaces. Each node may include a base transceiver system (BTS) that communicates via an antenna system over an air-link with one or more user devices that are within range. The core network 104 may provide telecommunication and data communication services to multiple user devices, including the IoT device 102.

The IoT device 102 may be equipped with application logic and a chipset. The application logic may perform specific predetermined tasks using hardware components of the IoT device, as well as entered in a sleep mode, e.g., PSM, and wake up from the sleep mode. The chipset may include communication hardware components that enable the IoT device 102 to communicate with multiple communication networks using different communication spectrums and/or standards. For example, the communication hardware components may include processors, modems, antenna, and/or so forth. The modems may support the sending and receiving of voice and data traffic through various communication standards, such as NB-IoT, LTE, 5G, 4G, etc. The chipset may further include a connectivity logic that encodes and routes data to the multiple communication networks via the communication hardware components.

The core network 104 may include components that support 2G and 3G voice traffic, as well as 3G, 4G, and 5G data traffic. For example, 3G data traffic between a user device and the Internet may be routed through a gateway of a 3G Packet Switch (PS) Core. On the other hand, 3G voice traffic between the user device and a Public Switched Telephone Network (PSTN) may be routed through a Mobile Switch (MSC) of a 3G Circuit Switch (CS) core. The core network 104 may further include components that support 4G and 5G voice and data traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers that are communicatively coupled to the core network 104, such as the LwM2M server 106.

The use of a 3GPP message to trigger queuing of messages by the LwM2M server following the IoT device 102 going into a sleep mode, e.g., PSM, may involve operations by several components of the core network, such as a Mobility Management Entity (MME) 108 and a Service Capability Exposure Function (SCEF)/Network Exposure Function (NEF) 110. The MME 108 is a part of the EPC that handles paging, authentication, and registration of user devices, as well as the routing of data and voice communications through selected gateways, such as a Servicing Gateway/PDN Gateway (SPGW). The SPGW may be a combined LTE serving gateway and LTE Packet Data Network (PDN) gateway that supports GPRS Tunneling Protocol (GTP)-based non-roaming and roaming architectures, as well as control plane and data plane functions for 3GPP networks. A SCEF is an interface for small data transfers and control messaging between IoT application servers, such as the LwM2M server 106, and the core network 104. The SCEF may be equipped with a software translation application 112 that translates 3GPP messages into non-3GPP messages, such as LwM2M messages. In some implementations, the SCEF may be used interchangeably with a NEF, or some other equivalent function. For example, a SCEF implemented in the context of 4G network technology is logically equivalent to a NEF implemented in the context of 5G network technology.

The LwM2M server 106 may be further communicatively coupled to an application server 114 that is operated by the wireless carrier network or a third-party service provider. The application server 114 may be configured to receive and process data from the IoT device 102, as well as send output back to the IoT device 102. For example, the IoT device 102 may include a temperature sensor that sends temperature readings to the application server 114. In turn, the application server 114 may analyze the temperature readings to determine whether the temperature readings are within a threshold range. When the temperature readings are not within a threshold range, the application server 114 may send communication messages to the IoT device 102 that prompt the device to activate a cooling fan. In another example, IoT device 102 may include a geolocation sensor that sends the geolocation readings to the application server 114. In turn, the application server 114 may determine whether the geolocation readings indicate that the IoT device 102 is within a predetermined geographical area. When a geolocation reading indicates that the IoT device 102 is outside of the predetermined geographical area, the application server 114 may send communication messages to the IoT device 102 to prompt the device to activate a camera and record video.

As shown in FIG. 1, when the IoT device 102 is in an active mode, the IoT device 102 may send data to the MME 108 via communication 116. The MME 108 may forward the data to the LwM2M server 106 via IP communication 118. In turn, the LwM2M server 106 may send the data to the application server 114 via IP communication 120. As an alternative to the IP communication 118, the MME 108 may send the data to the SCEF/NEF 110 via Non-IP Data Delivery (NIDD) communication 122. In turn, the SCEF/NEF 110 may forward the data to the LwM2M server 106 via a SCEF/NEF T8/N33 communication 124, or some other equivalent type of communication, with the LwM2M server 106. For example, T8 communication may be used in the context of 4G network technology, and N33 communication may be used in the context of 5G network technology.

However, when the IoT device 102 enters into sleep mode 126, the MME 108 may detect a lack of communication 128 from the IoT device 102. For example, the MME 108 may determine that there is a lack of communication when no communication is received from the IoT device 102 in a predetermined amount of time. In turn, the MME 108 may send a 3GPP UE Reachability notification message 130 to the SCEF/NEF 110. The 3GPP UE Reachability notification message 130 may include an indication of a loss of connectivity or a communication failure for the IoT device 102. The 3GPP UE Reachability notification message 130 may be intercepted by the translation application 112. For example, the SCEF/NEF 110 may send the 3GPP UE Reachability notification message 130 to the translation application 112 via SCEF/NEF T8/N33 communication 132 or some other equivalent type of communication. In turn, the translation application 112 may receive and translate the 3GPP UE Reachability notification message 130 into an LwM2M Reachability Indication message 134 indicating that the IoT device 102 is unreachable. In various embodiments, the translation involves the translation application 112 generating an LwM2M Reachability Indication message that is a logical equivalent of the 3GPP UE Reachability notification message 130. For example, the LwM2M Reachability Indication message 134 as generated by the translation application 112 may include a device identifier of the IoT device 102, a null flag value or a particular flag value (e.g., "0") that indicates unreachability of the IoT device 102, and/or a parameter value that indicates an amount of time that the IoT device 102 is unreachable.

In alternative embodiments, the translation application 112 may generate a custom non-LwM2M reachability status message that is logically equivalent to the LwM2M Reachability Indication message 134. In still other alternative embodiments, the translation application 112 may generate an application program interface (API) call to an API of the LwM2M server 106, in which the API call is logically equivalent to the LwM2M Reachability Indication message 134.

The translation application 112 may send the LwM2M Reachability Indication message 134, the custom non-LwM2M message, or the API call to the LwM2M server 106 to trigger the LwM2M server 106 to initiate a queue mode 136 for communication messages from the application server 114. The queue mode 136 means that the communication messages 138 from the application server 114 for the IoT device 102 are queued in an LwM2M server queue 142 of the LwM2M server 106 as queued messages 140. In some embodiments, the LwM2M server 106 may be configured with a software extension that determines a device identifier of the IoT device 102 from the content of the LwM2M Reachability Indication message 134, the custom non-LwM2M message, or the API call. Subsequently, the software extension may initiate queueing of the messages associated with the device identifier of the IoT device 102 by the LwM2M server 106 in the LwM2M server queue 142.

Figure 2:
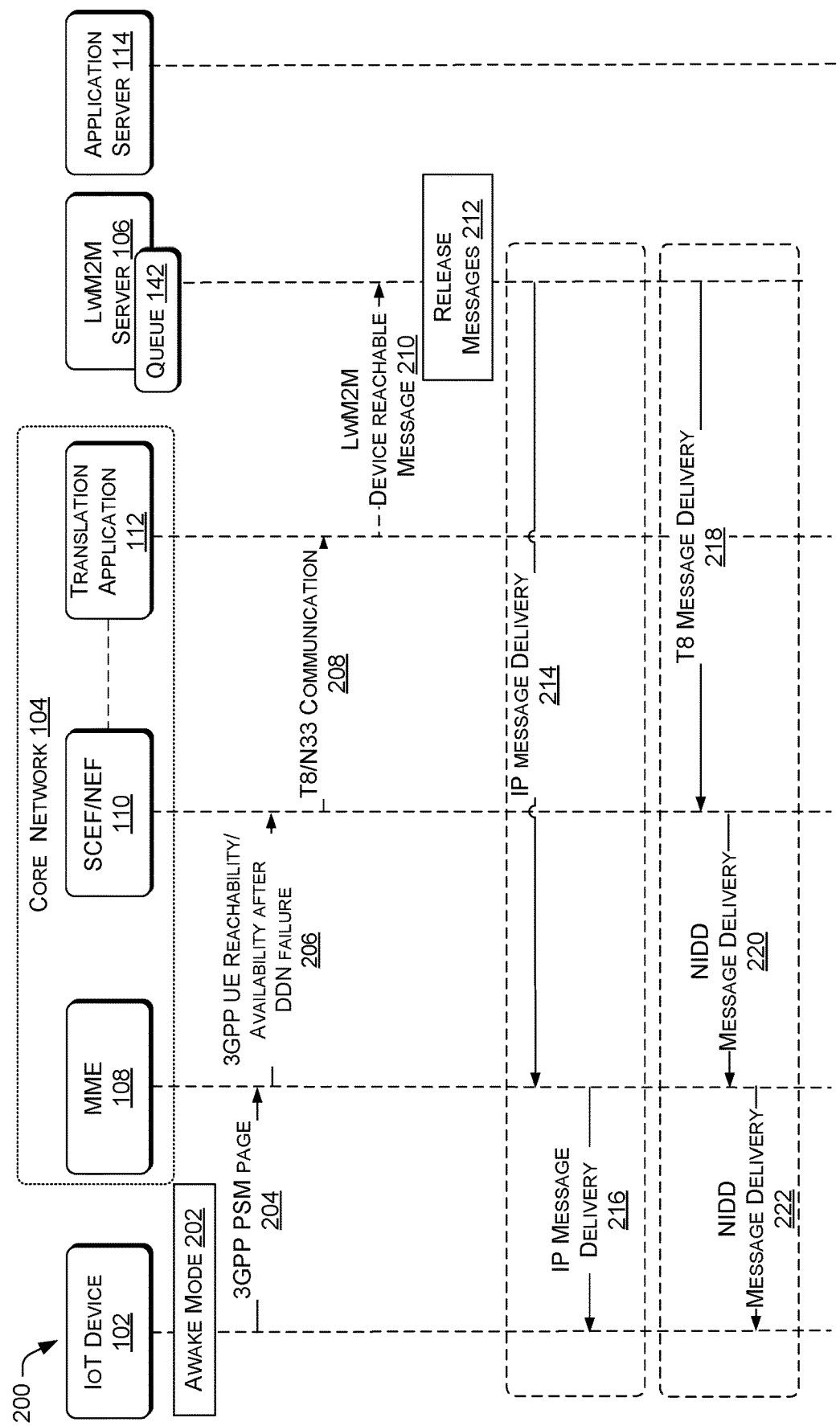
FIG. 2 illustrates an example protocol flow for using a 3GPP power saving mode (PSM) page to trigger a release of queued messages from a queue of the LwM2M server following the IoT device waking up from the sleep mode.

FIG. 2 illustrates an example protocol flow 200 for using a 3GPP power saving mode (PSM) page to trigger a release of queued messages from a queue of the LwM2M server following the IoT device waking up from the sleep mode. This example protocol flow may be implemented following the execution of the example protocol flow shown in FIG. 1. As shown in FIG. 2, the IoT device 102 may emerge from its sleep mode 126 into an awake mode 202. The awake mode 202 means that the IoT device 102 is ready to communicate with the LwM2M server 106. Accordingly, the IoT device 102 may send a 3GPP PSM page 204 to the MME 108 to indicate that the IoT device is awake. In turn, the MME 108 may send a 3GPP UE Reachability notification message 206 that includes an indication of UE reachability or availability after Downlink Data Notification (DDN) failure for the IoT device 102.

In various embodiments, the 3GPP UE Reachability notification message 206 may be intercepted by the translation application 112. For example, the SCEF/NEF 110 may send the 3GPP UE Reachability notification message 206 to the translation application 112 via SCEF/NEF T8/N33 communication 208 or some other equivalent type of communication. In turn, the translation application 112 may receive and translate the 3GPP UE Reachability notification message 206 into an LwM2M device reachable message 210. In some embodiments, the LwM2M device reachable message 210 may be an LwM2M Registration Update message or an LwM2M Reachability Indication message indicating that the IoT device 102 is reachable. In such embodiments, the translation involves the translation application 112 generating an LwM2M Registration Update message or an LwM2M Reachability Indication message that is a logical equivalent of the 3GPP UE Reachability notification message 130. The LwM2M Reachability Indication message may be messages that conform to one or more LwM2M standards. For example, the LwM2M Reachability Indication message as generated by the translation application 112 may include a device identifier of the IoT device 102 and a particular flag value (e.g., "1") indicating that the IoT device 102 is reachable. However, in other embodiments, the LwM2M device reachable message 210 may be a logically equivalent custom non-LwM2M reachability status message or be substituted with a logically equivalent application program interface (API) call to an API of the LwM2M server 106.

The translation application 112 may send the LwM2M device reachable message 210, the logically equivalent non-LwM2M message, or the logically equivalent API call, to the LwM2M server 106 to trigger the LwM2M server 106 to release the one or more communication messages 212 that are queued for the IoT device 102 (e.g., queued messages 140) from the queue of the LwM2M server 106. In some embodiments, the LwM2M server 106 may be configured with a software extension that determines a device identifier of the IoT device 102 from the content of the LwM2M Reachability Indication message 210, the logically equivalent non-LwM2M message, or the logically equivalent API call, and then determines whether there are one or more communication messages 212 stored in the LwM2M server queue 142 for the device identifier of the IoT device 102. If the one or more communication messages 212 are stored, the software extension may direct the LwM2M server 106 to release the one or more communication messages 212 from the LwM2M server queue 142. However, if there are no communication messages stored in the LwM2M server queue 142 for the IoT device 102, the software extension may direct the LwM2M server 106 to perform no action with respect to message release.

The one or more released communication messages may be delivered to the IoT device 102 in different ways. In some embodiments, the LwM2M server 106 may send the one or more communication messages 212 to the MME 108 via IP message delivery 214. In other words, the LwM2M server 106 may send the one or more communication messages 212 to the MME 108 via IP communication. In turn, the MME 108 may send the one or more communication messages 212 to the IoT device 102 via IP message delivery 216. In other words, MME 108 may send the one or more communication messages 212 to the IoT device 102 via IP communication.

In alternative embodiments, the LwM2M server 106 may send the one or more communication messages 212 to the SCEF/NEF 110 via T8/N33 message delivery 218, or some other equivalent type of message delivery. In other words, the LwM2M server 106 may send the one or more communication messages 212 to the SCEF/NEF 110 via SCEF/NEF T8/N33 communication, or some other equivalent type of communication. In turn, the SCEF/NEF 110 may send the one or more communication messages 212 to the MME 108 via NIDD message delivery 220. In other words, the SCEF/NEF 110 may send the one or more communication messages 212 to the SCEF/NEF 110 via NIDD communication. Subsequently, the one or more communication messages 212 may be sent by the MME 108 to the IoT device 102 via another NIDD message delivery 222.

Figure 3:
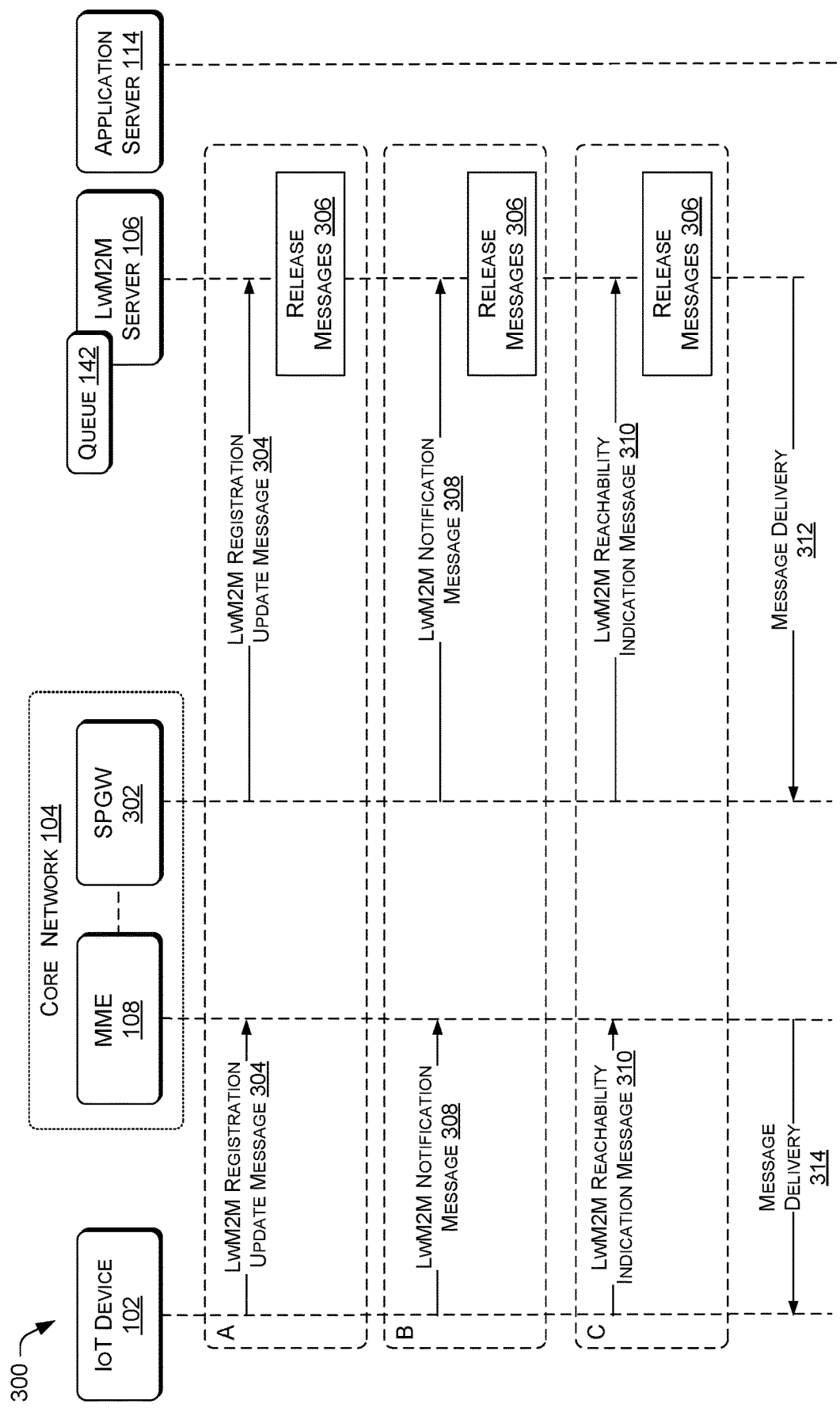
FIG. 3 illustrates example protocol flows for using LwM2M messages to trigger a release of queued communication messages from a queue of the LwM2M server.

FIG. 3 illustrates example protocol flows 300 for using LwM2M messages to trigger a release of queued communication messages from a queue of the LwM2M server. The LwM2M messages, which are sent by the IoT device 102, may serve as explicit indications that the IoT device 102 is awake and ready for communication. These example protocol flows may be implemented following the execution of the example protocol flow shown in FIG. 1. As shown in FIG. 3, the MME 108 may use an SPGW 320 to exchange messages with the LwM2M server 106.

In scenario A, the IoT device 102 may send an LwM2M Registration Update message 304 to the MME 108. In turn, the SPGW 302 that is communicatively coupled to the MME 108 may send the LwM2M Registration Update message 304 as received by the MME 108 to the LwM2M server 106. In response, the LwM2M server 106 may be triggered by the LwM2M Registration Update message 304 to release the one or more communication messages 306 that are queued for the IoT device 102 (e.g., queued messages 140) from the queue of the LwM2M server 106. In some embodiments, the one or more communication messages 306 may have originated from the application server 114.

In scenario B, the IoT device 102 may send an LwM2M Notification message 308 to the MME 108. In turn, the SPGW 302 that is communicatively coupled to the MME 108 may forward the LwM2M Notification message 308 as received by the MME 108 to the LwM2M server 106. In response, the LwM2M server 106 may be triggered by the LwM2M Notification message 308 to release the one or more communication messages 306 that are queued for the IoT device 102 (e.g., queued messages 140) from the queue of the LwM2M server 106.

In various embodiments, the LwM2M server 106 may be configured with a software extension that determines a device identifier of the IoT device 102 from the content of the LwM2M Notification message 308, and then determines whether there are one or more communication messages 306 stored in the LwM2M server queue 142 for the device identifier of the IoT device 102. If the one or more communication messages 306 are stored, the software extension may direct the LwM2M server 106 to release the one or more communication messages 306 from the LwM2M server queue 142. However, if there are no communication messages stored in the LwM2M server queue 142 for the IoT device 102, the software extension may direct the LwM2M server 106 to perform no action with respect to message release.

In scenario C, the IoT device 102 may send an LwM2M Reachability Indication message 310 to the MME 108. In turn, the SPGW 302 that is communicatively coupled to the MME 108 may forward the LwM2M Reachability Indication message 310 as received by the MME 108 to the LwM2M server 106. In turn, the LwM2M server 106 may be triggered by the LwM2M Reachability Indication message 310 to release the one or more communication messages 306 that are queued for the IoT device 102 (e.g., queued messages 140) from the queue of the LwM2M server 106.

In various embodiments, the LwM2M server 106 may be configured with a software extension that determines a device identifier of the IoT device 102 from the content of the LwM2M Reachability Indication message 310, and then determines whether there are one or more communication messages 306 stored in the LwM2M server queue 142 for the device identifier of the IoT device 102. If the one or more communication messages 306 are stored, the software extension may direct the LwM2M server 106 to release the one or more communication messages 306 from the LwM2M server queue 142. However, if there are no communication messages stored in the LwM2M server queue 142 for the IoT device 102, the software extension may direct the LwM2M server 106 to perform no action with respect to message release. Regardless of the scenario, the one or more communication messages 306 may be delivered by the LwM2M server to the SPGW 302 via message delivery 312. In response, the MME 108 may deliver the one or more communication messages 306 to the IoT device 102 via message delivery 314. In various embodiments, each of the message delivery may be implemented using IP communication or NIDD communication.

Figure 4:
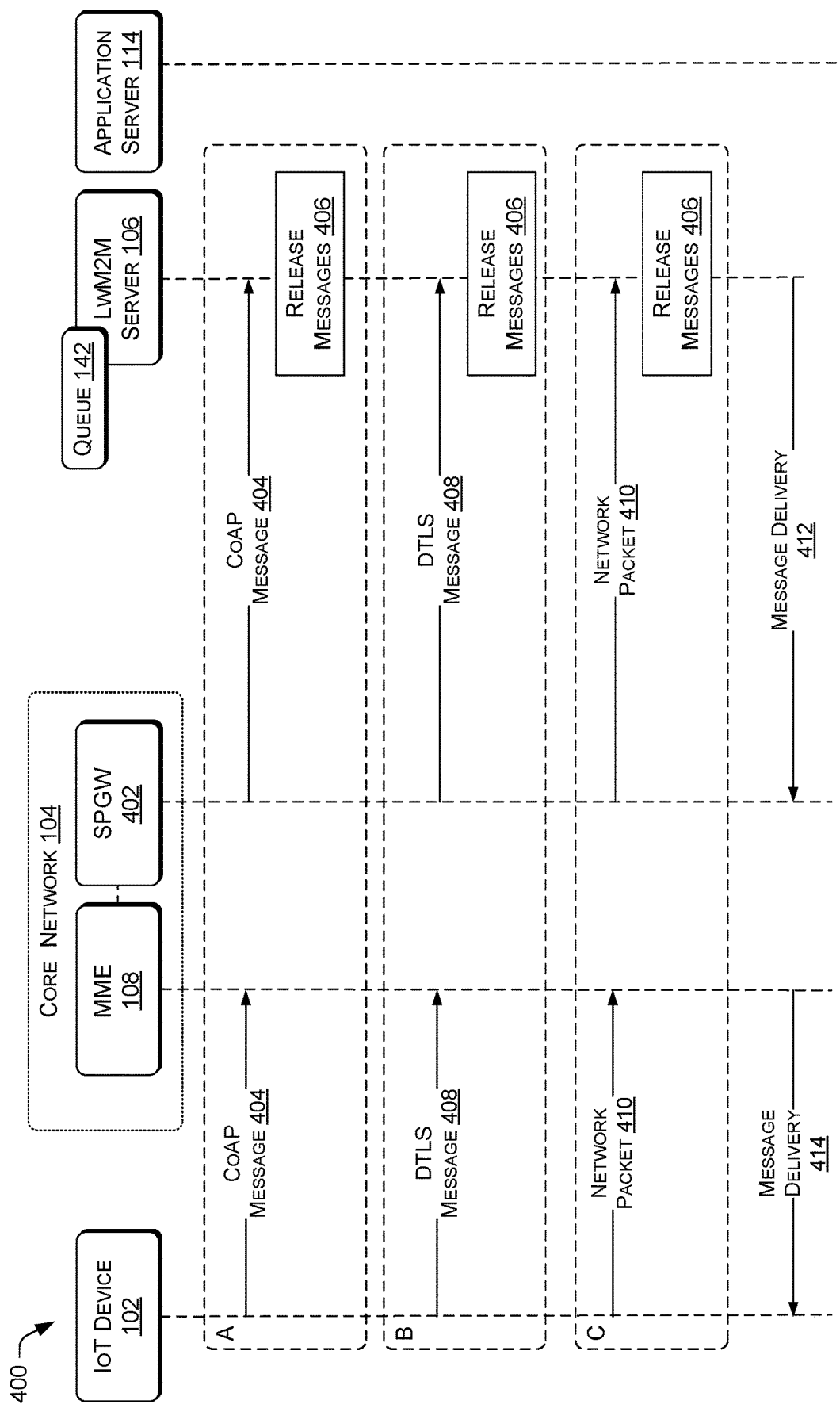
FIG. 4 illustrates example protocol flows for using networking messages to trigger a release of queued communication messages from a queue of the LwM2M server.

FIG. 4 illustrates example protocol flows 400 for using networking messages to trigger a release of queued communication messages from a queue of the LwM2M server. The networking messages, which are sent by the IoT device 102, may serve as explicit indications that the IoT device 102 is awake and ready for communication. These example protocol flows may be implemented following the execution of the example protocol flow shown in FIG. 1. As shown in FIG. 4, the MME 108 may use an SPGW 402 to exchange messages with the LwM2M server 106.

In scenario A, the IoT device 102 may send a CoAP message 404 to the MME 108. In various embodiments, the CoAP message 404 may be a CoAP Confirmable (CON) message, a CoAP Non-Confirmable (NON) message, or a CoAP Acknowledgement (ACK) message. In turn, the SPGW 302 that is communicatively coupled to the MME 108 may send the CoAP message 404 as received by the MME 108 to the LwM2M server 106. In response, the LwM2M server 106 may be triggered by the CoAP message 404 to release the one or more communication messages 406 that are queued for the IoT device 102 (e.g., queued messages 140) from the LwM2M server queue 142 of the LwM2M server 106. In some embodiments, the one or more communication messages 406 may have originated from the application server 114.

In scenario B, the IoT device 102 may send a DTLS message 408 to the MME 108. In various embodiments, the DTLS message 408 may be a DTLS handshake message, a DTLS handshake resumption message, or a DTLS heartbeat message. In turn, the SPGW 402 that is communicatively coupled to the MME 108 may send the DTLS message 408 as received by the MME 108 to the LwM2M server 106. In response, the LwM2M server 106 may be triggered by the DTLS message 408 to release the one or more communication messages 406 that are queued for the IoT device 102 (e.g., queued messages 140) from the LwM2M server queue 142 of the LwM2M server 106. In alternative embodiments, each type of the DTLS messages described with respect to scenario B may be substituted with a logically equivalent TLS message type. For example, a DTLS handshake message may be replaced with a logically equivalent TLS handshake message, a DTLS handshake resumption message may be replaced with a logically equivalent TLS handshake resumption message, and a DTLS heartbeat message may be replaced with a logically equivalent heartbeat message.

In scenario C, the IoT device 102 may send a network packet 410, such as an IP packet, a UDP packet, or a TCP packet to the MME 108. In various embodiments, the UDP packet or the TCP packet may include an empty or custom payload. In turn, the SPGW 302 that is communicatively coupled to the MME 108 may send the network packet 410 as received by the MME 108 to the LwM2M server 106. In response, the LwM2M server 106 may be triggered by the network packet 410 to release the one or more communication messages 406 that are queued for the IoT device 102 (e.g., queued messages 140) from the LwM2M server queue 142 of the LwM2M server 106.

Regardless of the scenario, the LwM2M server 106 may be configured with a software extension that determines a device identifier of the IoT device 102 from the content of a message or a packet, and then determines whether there are one or more communication messages 406 stored in the LwM2M server queue 142 for the device identifier of the IoT device 102. If the one or more communication messages 406 are stored, the software extension may direct the LwM2M server 106 to release the one or more communication messages 406 from the LwM2M server queue 142. However, if there are no communication messages stored in the LwM2M server queue 142 for the IoT device 102, the software extension may direct the LwM2M server 106 to perform no action with respect to message release. Further, the one or more communication messages 406 may be delivered by the LwM2M server to the SPGW 402 via message delivery 412. In response, the MME 108 may deliver the one or more communication messages 406 to the IoT device 102 via message delivery 414. In various embodiments, each of the message delivery may be implemented using IP communication or NIDD communication.

In alternative implementations of the protocol flows shown in FIGS. 1-4, the LwM2M server 106 may be substituted with a CoAP server, and the LwM2M server queue 142 may be substituted with an LwM2M server queue. For example, the CoAP server and the CoAP server queue are implemented with the same logic and functions as the LwM2M server and the LwM2M server queue. In such implementation, the custom non-LwM2M reachability status messages described with respect to FIGS. 1 and 2 may be logically equivalent CoAP messages. Further, with respect to FIG. 3, the LwM2M messages described in the various scenarios may instead be logically equivalent CoAP messages. For example, the LwM2M Registration Update message 304 shown in FIG. 3 may instead be a logically equivalent CoAP Registration message.

Example Computing Device Components

Figure 5:
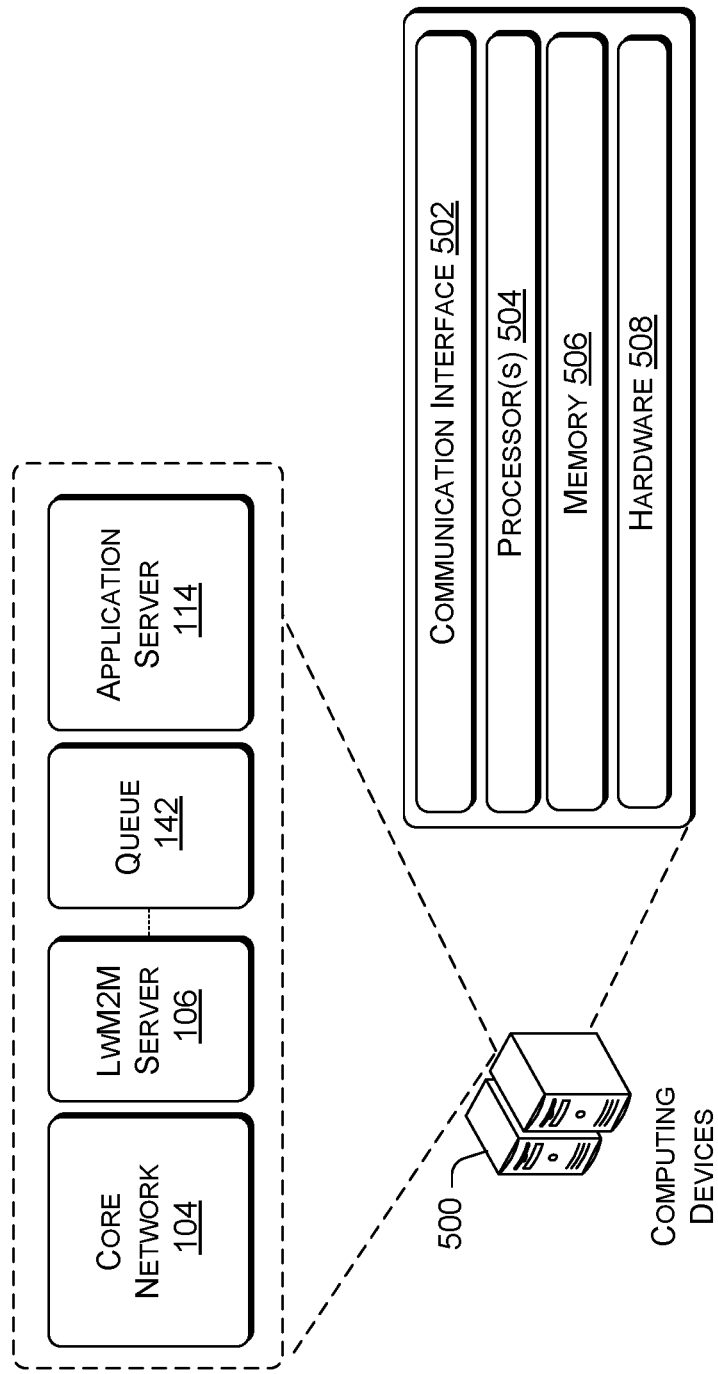
FIG. 5 is a block diagram showing various components of one or more computing devices that provide integration of 3GPP PSM and LwM2M queuing.

FIG. 5 is a block diagram showing various components of one or more computing devices that provide integration of 3GPP PSM and LwM2M queuing. The computing devices 500 may include a communication interface 502, one or more processors 504, memory 506, and hardware 508. The communication interface 502 may include wireless and/or wired communication components that enable the computing devices 500 to transmit data to and receive data from other networked devices. The hardware 508 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 506 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 500 or components thereof may be virtual computing devices in the form of virtual machines or software containers that are hosted in a computing cloud with hardware at different geographical locations.

In various embodiments, the computing devices 500 may be used to implement the various backend services and components of the wireless communication carrier, as well as components of third-party service providers. For example, these components may include the core network 104, the LwM2M server 106 that is equipped with the LwM2M server queue 142, and the application server 114. The implementation involves the execution of software, applications, and/or modules that include routines, program instructions, code segments, extensions, objects, and/or data structures that perform particular tasks or implement particular abstract data types.

Example Processes

FIGS. 6-10 present illustrative processes 600-1000 for implementing efficient interactions for supporting message queuing for IoT devices that enter into power saving mode. Each of the processes 600-1000 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-1000 are described with reference to the example protocol flows shown in FIGS. 1-4.

Figure 6:
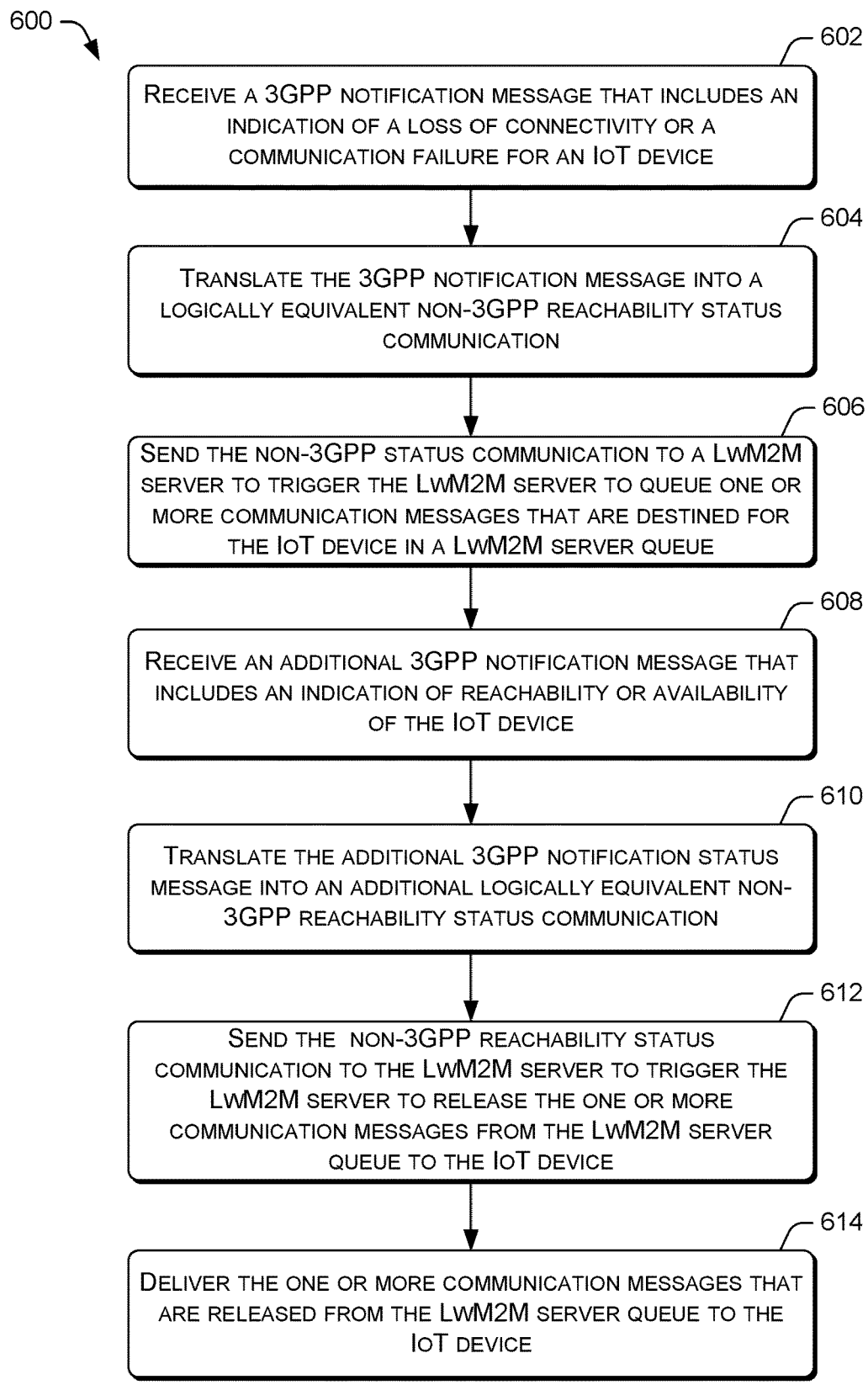
FIG. 6 is a flow diagram of an example process for using 3GPP messages to trigger a queuing of communication messages by an LwM2M server and release of the queued messages by the LwM2M server.

FIG. 6 is a flow diagram of an example process 600 for using 3GPP messages to trigger a queuing of communication messages by an LwM2M server and release of the queued messages by the LwM2M server. At block 602, the translation application 112 associated with the SCEF/NEF 110 of the core network 104 may receive a 3GPP notification message that includes an indication of a loss of connectivity or a communication failure for the IoT device 102. In various embodiments, the 3GPP message may be generated by the MME 108 in response to the MME 108 detecting a lack of communication from the IoT device 102. In at least one embodiment, the 3GPP notification message may be a UE Reachability notification message.

At block 604, the translation application 112 may translate the 3GPP notification message into a logically equivalent non-3GPP reachability status communication. As used herein, "non-3GPP" communication refers to a communication that does not conform with 3GPP standards. The non-3GPP reachability status communication may be a logically equivalent LwM2M Reachability Indication message, a logically equivalent custom non-LwM2M reachability status message, or a logically equivalent API call.

At block 606, the translation application 112 may send the non-3GPP status communication to the LwM2M server 106 to trigger the LwM2M server 106 to queue one or more communication messages that are destined for the IoT device 102 in an LwM2M server queue 142. In at least one embodiment, the one or more communication messages may be generated by an application server, such as the application server 114.

At block 608, the translation application 112 may receive an additional 3GPP notification message that includes an indication of reachability or availability for the IoT device 102. In various embodiments, the 3GPP message may be generated by the MME 108 in response to the MME 108 receiving a 3GPP PSM page from the IoT device 102 indicating that the IoT device 102 has emerged from a sleep mode and is active. In at least one embodiment, the 3GPP notification message may be a UE Reachability notification message that indicates UE reachability or availability after Downlink Data Notification (DDN) failure for the IoT device 102.

At block 610, the translation application 112 may translate the additional 3GPP notification message into an additional logically equivalent non-3GPP reachability status communication. In various embodiments, the additional non-3GPP reachability status communication may be a logically equivalent LwM2M Registration Update message, a logically equivalent LwM2M Reachability Indication message, a logically equivalent custom non-LwM2M reachability status message, or a logically equivalent API call.

At block 612, the translation application 112 may send the non-3GPP reachability status communication to the KwM2M server 106 to trigger the LwM2M server 106 to release one or more communication messages from the LwM2M server queue 142 to the IoT device 102. At block 614, the core network 104 may deliver the one or more communication messages that are released from the LwM2M server queue 142 to the IoT device 102. In some embodiments, the delivery of the one or more communication messages may be performed via IP communication through the MME 108. In other embodiments, the delivery of the one or more communication messages may be performed via NIDD communication through the MME 108 and the SCEF/NEF 110.

Figure 7:
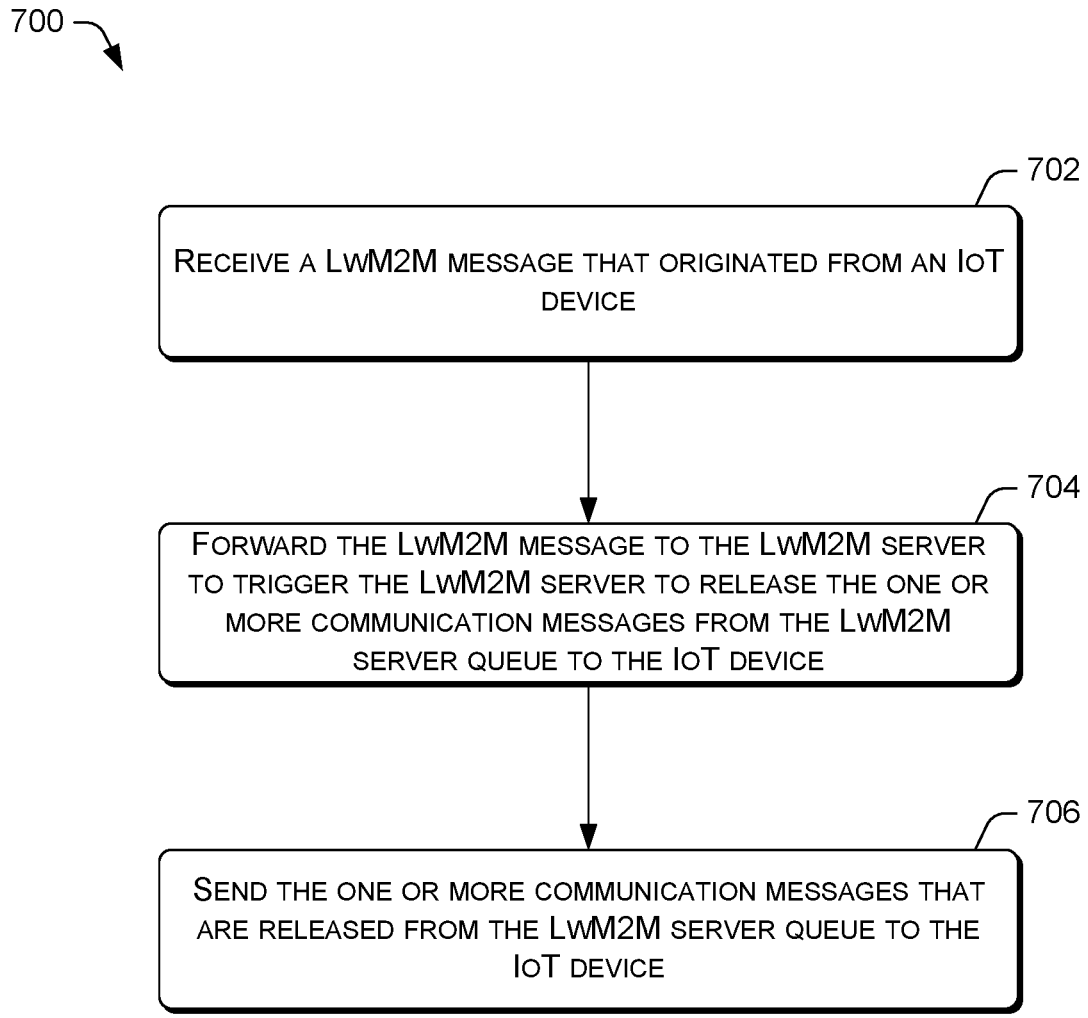
FIG. 7 is a flow diagram of an example process for using LwM2M messages to trigger a release of queued communication messages from a queue of the LwM2M server.

FIG. 7 is a flow diagram of an example process 700 for using LwM2M messages to trigger a release of queued communication messages from a queue of the LwM2M server. At block 702, the core network 104 may receive an LwM2M message that originated from the IoT device 102. The LwM2M message may be an LwM2M Registration Update message, an LwM2M Notification message, or an LwM2M Reachability Indication message. In various embodiments, the MME 108 of the core network 104 may receive such an LwM2M message from the IoT device 102.

At block 704, the core network 104 may forward the LwM2M message to the LwM2M server 106 to trigger the LwM2M server 106 to release the one or more communication messages from the LwM2M server queue 142 to the IoT device. In various embodiments, an SPGW of the MME 108 may send the LwM2M message to the LwM2M server 106. At block 706, the core network 104 may send the one or more communication messages that are released from the LwM2M server queue 142 to the IoT device 102. In various embodiments, the one or more communication messages may be sent to the IoT device 102 via the MME 108.

Figure 8:
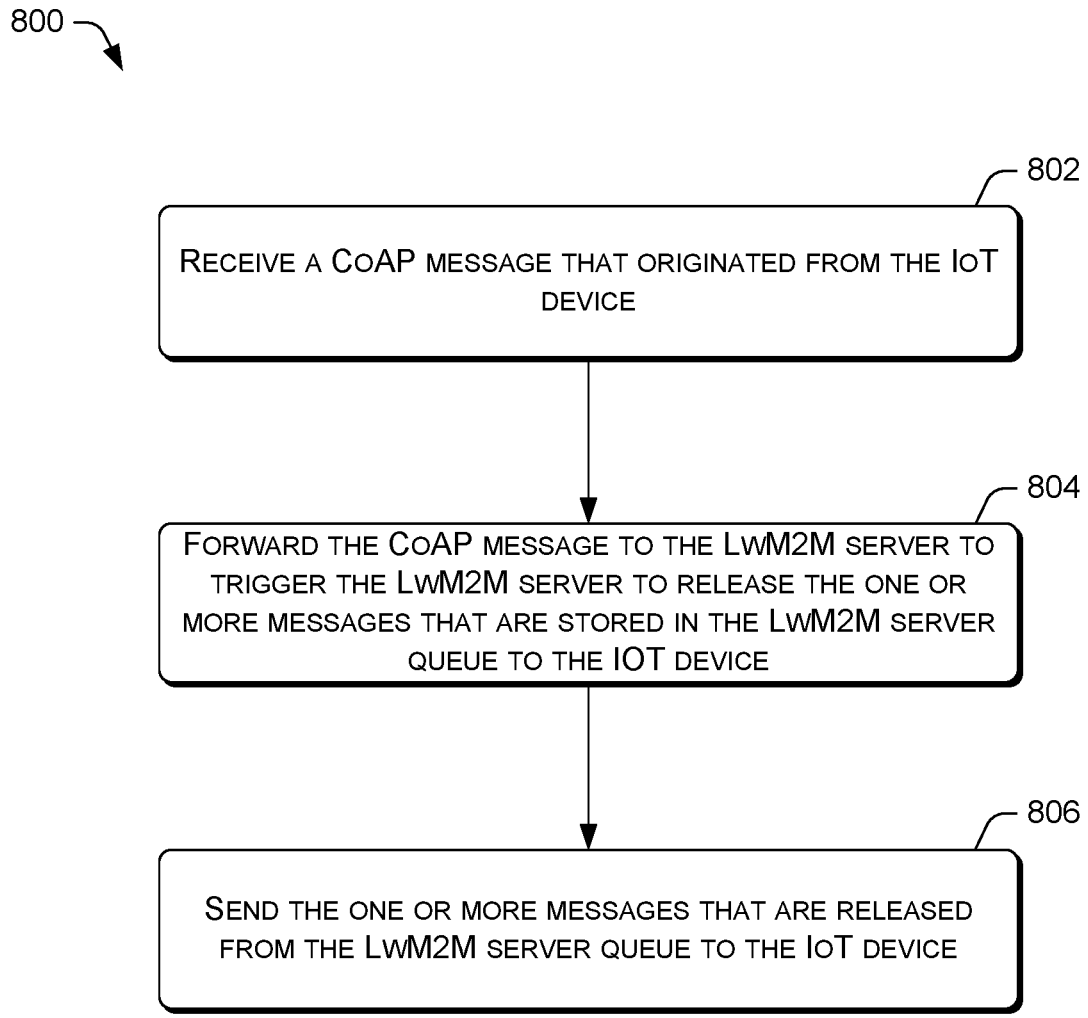
FIG. 8 is a flow diagram of an example process for using CoAP messages to trigger a release of queued communication messages from a queue of the LwM2M server.

FIG. 8 is a flow diagram of an example process 800 for using CoAP messages to trigger a release of queued communication messages from a queue of the LwM2M server. At block 802, the core network 104 may receive a CoAP message that originated from the IoT device 102. The CoAP message may be a CoAP Confirmable (CON) message, a CoAP Non-Confirmable (NON) message, or a CoAP Acknowledgement (ACK) message. In various embodiments, the MME 108 of the core network 104 may receive such a CoAP message from the IoT device 102.

At block 804, the core network 104 may forward the CoAP message to the LwM2M server 106 to trigger the LwM2M server 106 to release the one or more communication messages from the LwM2M server queue 142 to the IoT device. In various embodiments, an SPGW of the MME 108 may send the CoAP message to the LwM2M server 106. At block 806, the core network 104 may send the one or more communication messages that are released from the LwM2M server queue 142 to the IoT device 102. In various embodiments, the one or more communication messages may be sent via the MME 108.

Figure 9:
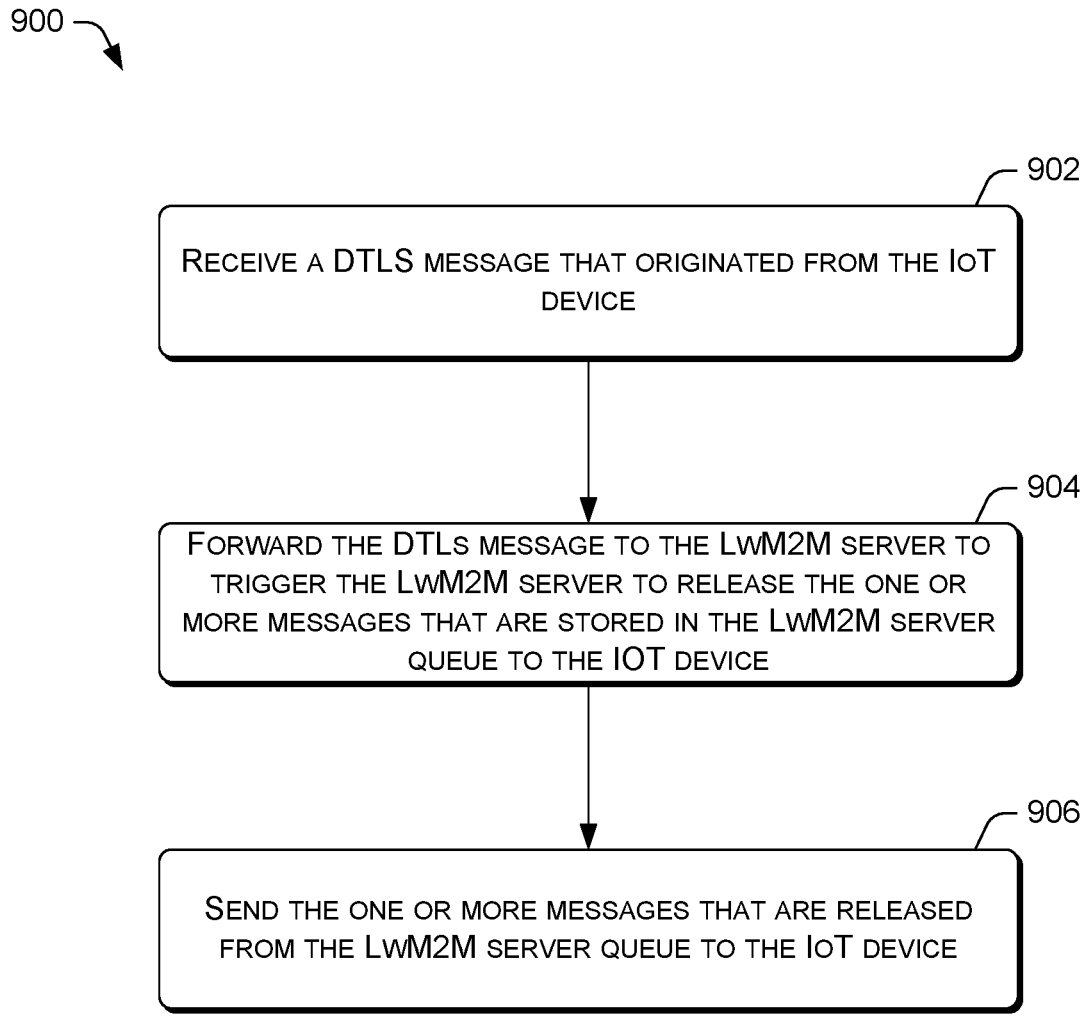
FIG. 9 is a flow diagram of an example process for using DTLS messages to trigger a release of queued communication messages from a queue of the LwM2M server.

FIG. 9 is a flow diagram of an example process 900 for using DTLS messages to trigger a release of queued communication messages from a queue of the LwM2M server. At block 902, the core network 104 may receive a DTLS message that originated from the IoT device 102. The DTLS message may be a DTLS handshake message, a DTLS handshake resumption message, or a DTLS heartbeat message. In various embodiments, the MME 108 of the core network 104 may receive such a DTLS message from the IoT device 102.

At block 904, the core network 104 may forward the DTLS message to the LwM2M server 106 to trigger the LwM2M server 106 to release the one or more communication messages from the LwM2M server queue 142 to the IoT device. In various embodiments, an SPGW of the MME 108 may send the DTLS message to the LwM2M server 106. At block 906, the core network 104 may send the one or more communication messages that are released from the LwM2M server queue 142 to the IoT device 102. In various embodiments, the one or more communication messages may be sent to the IoT device 102 via the MME 108. In alternative embodiments, each type of the DTLS messages described in example process 900 may be substituted with a logically equivalent TLS message type.

Figure 10:
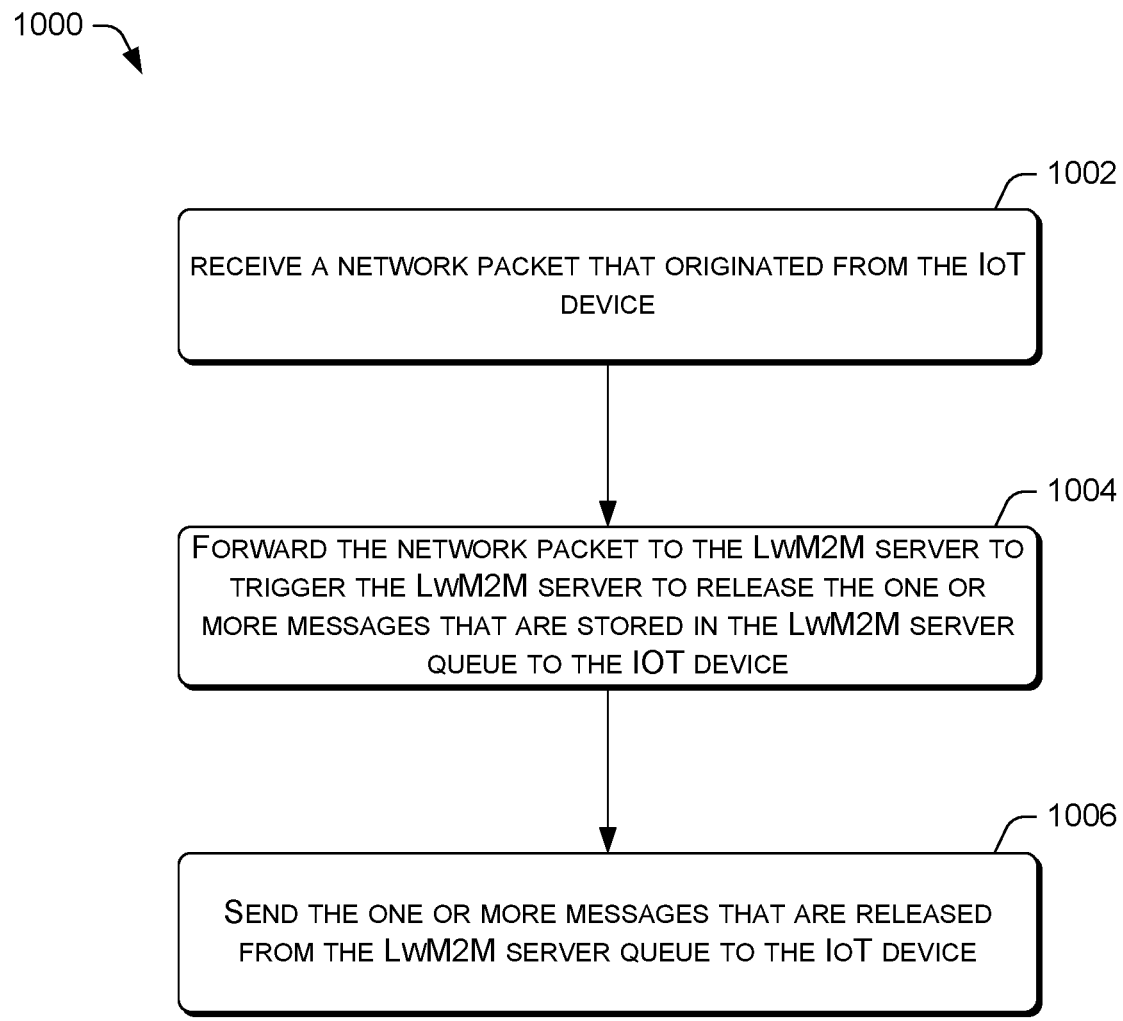
FIG. 10 is a flow diagram of an example process for using a network packet to trigger release of queued communication messages from a queue of the LwM2M server.

FIG. 10 is a flow diagram of an example process 1000 for using a network packet to trigger a release of queued communication messages from a queue of the LwM2M server. At block 1002, the core network 104 may receive a network packet that originated from the IoT device 102. The network packet may be an IP packet, a UDP packet, or a TCP packet. In some instances, the UDP packet or the TCP packet may include an empty or custom payload. In various embodiments, the MME 108 of the core network 104 may receive such a network packet from the IoT device 102.

At block 1004, the core network 104 may forward the network packet to the LwM2M server 106 to trigger the LwM2M server 106 to release the one or more communication messages from the LwM2M server queue 142 to the IoT device. In various embodiments, an SPGW of the MME 108 may send the network packet to the LwM2M server 106. At block 1006, the core network 104 may send the one or more communication messages that are released from the LwM2M server queue 142 to the IoT device 102. In various embodiments, the one or more communication messages may be sent to the IoT device 102 via the MME 108.

In alternative implementations of the example processes shown in FIGS. 6-10, the LwM2M server 106 may be substituted with a CoAP server, and the LwM2M server queue 142 may be substituted with an LwM2M server queue. For example, the CoAP server and the CoAP server queue are implemented with the same logic and functions as the LwM2M server and the LwM2M server queue. In such implementation, the custom non-LwM2M reachability status messages described with respect to FIG. 6 may be logically equivalent CoAP messages. Further, with respect to FIG. 7, the LwM2M message may instead be a logically equivalent CoAP message.

The translation and use of 3GPP messages to trigger the LwM2M server to queue and release messages that are destined for the IoT device may provide several benefits. For example, because power-constrained IoT devices have limited battery life, the use of the less energy-intensive 3GPP messages to notify the LwM2M server to queue and release messages for the IoT device may increase the operational longevity of the IoT device. Further, because IoT devices are generally configured to send 3GPP messages more often than LwM2M messages, e.g., every tens of minutes instead of hours, the amount of time that the IoT devices are incommunicado and unable to receive queued messages for the LwM2M server may be reduced.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a core network of a wireless carrier network storing computer-executable instructions that upon execution cause one or more computing devices to perform acts comprising:
receiving a $3^{rd}$ Generation Partnership Project (3GPP) notification message that includes an indication of a loss of connectivity or a communication failure for an Internet-of-Things (IoT) device at a translation application in the core network;
translating the 3GPP notification message into a logically equivalent non-3GPP reachability status communication at the translation application, the non-3GPP status communication indicating that the IoT device is unreachable; and
sending the non-3GPP reachability status communication to a server of the wireless carrier network to trigger the server to queue one or more communication messages that are destined for the IoT device in a server queue, wherein the server is a Lightweight Machine-to-Machine (LwM2M) server or a Constrained Application Protocol (CoAP) server, and the server queue is an LwM2M server queue or a CoAP server queue.

2. The one or more non-transitory computer-readable media of claim 1, wherein the non-3GPP reachability status communication includes a logically equivalent LwM2M Reachability Indication message, a logically equivalent custom non-LwM2M reachability status message, or a logically equivalent API call.

3. The one or more non-transitory computer-readable media of claim 2, wherein the translating the 3GPP notification message includes formatting the logically equivalent LwM2M Reachability Indication message to include an empty flag value or a particular a flag value that indicates unreachability.

4. The one or more non-transitory computer-readable media of claim 2, wherein the logically equivalent LwM2M Reachability Indication message includes a parameter that indicates an amount of time that the IoT device is unreachable to the server.

5. The one or more non-transitory computer-readable media of claim 1, wherein the translation application is associated with a Service Capability Exposure Function (SCEF) or a Network Exposure Function (NEF), and wherein the receiving includes receiving the 3GPP notification message at the SCEF or the NEF from a Mobility Management Entity (MME) of the wireless carrier network that detected a lack of communication for the IoT device.

6. The one or more non-transitory computer-readable media of claim 1, wherein the acts further comprise:
receiving an additional 3GPP notification message that includes an indication of reachability or availability of the IoT device at the translation application;
translating the additional 3GPP notification message into an additional non-3GPP reachability status communication indicating that the IoT device reachable; and
sending the additional non-3GPP reachability status communication to the server to trigger the server to release the one or more communication messages from the server queue to the IoT device.

7. The one or more non-transitory computer-readable media of claim 6, wherein the 3GPP notification message is a 3GPP user equipment (UE) Reachability notification message that indicates the IoT device is unreachable, and wherein the additional 3GPP notification message is an additional 3GPP UE Reachability notification message that indicates UE reachability or availability after Downlink Data Notification (DDN) failure for the IoT device.

8. The one or more non-transitory computer-readable media of claim 6, wherein the additional non-3GPP reachability status communication includes a logically equivalent LwM2M Registration Update message, a logically equivalent LwM2M Reachability Indication message, a logically equivalent custom non-LwM2M reachability status message, or a logically equivalent API call.

9. The one or more non-transitory computer-readable media of claim 8, wherein the translating the additional 3GPP notification message includes formatting the logically equivalent LwM2M Reachability Indication message to include a flag value that indicates reachability.

10. The one or more non-transitory computer-readable media of claim 6, wherein the server is configured to send the one or more communication messages that are released to the IoT device via at least one of a Mobility Management Entity (MME), a Service Capability Exposure Function (SCEF), or a Network Exposure Function (NEF) of the core network.

11. The one or more non-transitory computer-readable media of claim 1, wherein the one or more communication messages originated from an application server that is communicatively coupled to the server.

12. A computer-implemented method, comprising:
receiving, at a translation application associated with a Service Capability Exposure Function (SCEF) or a Network Exposure Function (NEF) of a core network in a wireless carrier network, a 3rd Generation Partnership Project (3GPP) notification message that includes an indication of a loss of connectivity or a communication failure for an Internet-of-Things (IoT) device at a translation application in the core network of a wireless carrier network;
translating, via the translation application, the 3GPP notification message into a logically equivalent non-3GPP reachability status communication at the translation application, the non-3GPP status communication indicating that the IoT device is unreachable; and
sending, via the translation application, the non-3GPP reachability status communication to a server of the wireless carrier network to trigger the server to queue one or more communication messages that are destined for the IoT device in a server queue,
wherein the server is a Lightweight Machine-to-Machine (LwM2M) server or a Constrained Application Protocol (CoAP) server, and the server queue is an LwM2M server queue or a CoAP server queue.

13. The computer-implemented method of claim 12, wherein the non-3GPP reachability status communication includes a logically equivalent LwM2M Reachability Indication message, a logically equivalent custom non-LwM2M reachability status message, or a logically equivalent API call.

14. The computer-implemented method of claim 12, further comprising:
receiving, at the translation application, an additional 3GPP notification message that includes an indication of reachability or availability of the IoT device at the translation application;
translating, via the translation application, the additional 3GPP notification message into an additional non-3GPP reachability status communication indicating that the IoT device reachable; and
sending, via the translation application, the additional non-3GPP reachability status communication to the server to trigger the server to release the one or more communication messages from the server queue to the IoT device.

15. The computer-implemented method of claim 12, further comprising:
receiving, at a Mobility Management Entity (MME) of the core network, an LwM2M message that originated from the IoT device; and
forwarding, via the MME of the core network, the LwM2M message to the server to trigger the server to release the one or more communication messages from the server queue to the IoT device,
wherein the LwM2M message is an LwM2M Registration Update message, an LwM2M Notification message, or an LwM2M Reachability Indication message.

16. The computer-implemented method of claim 12, further comprising:
receiving, at a Mobility Management Entity (MME) of the core network, a Constrained Application Protocol (CoAP) message that originated from the IoT device; and
forwarding, via the MME of the core network, the CoAP message to the server to trigger the server to release the one or more communication messages that are stored in the server queue to the IoT device, wherein the CoAP message is a CoAP Confirmable (CON) message, a CoAP Non-Confirmable (NON) message, or a CoAP Acknowledgement (ACK) message, or any CoAP message that is logically equivalent to an LwM2M message.

17. The computer-implemented method of claim 12, further comprising:
receiving, at a Mobility Management Entity (MME) of the core network, a Datagram Transport Layer Security (DTLS) message or a TLS message that originated from the IoT device; and
forwarding, via the MME of the core network, the DTLS message or the TLS message to the server to trigger the server to release the one or more communication messages that are stored in the server queue to the IoT device,
wherein the DTLS message or the TLS message is a handshake message, a handshake resumption message, or a heartbeat message.

18. The computer-implemented method of claim 12, further comprising:
receiving, at a Mobility Management Entity (MME) of the core network, an Internet Protocol (IP) packet, a User Datagram Protocol (UDP) packet, or a Transmission Protocol Protocol (TCP) packet that originated from the IoT device, wherein the UDP packet or the TCP packet includes an empty or custom payload; and
forward, via the MME, the IP packet, the UDP packet, or the TCP packet to the server to trigger the server to release the one or more communication messages that are stored in the server queue to the IoT device.

19. A system, comprising:
one or more processors; and
memory including a plurality of computer-executable components that are executable by the one or more processors to perform a plurality of actions, the plurality of actions comprising:
receiving a 3rd Generation Partnership Project (3GPP) notification message that includes an indication of a loss of connectivity or a communication failure for an Internet-of-Things (IoT) device at a translation application in a core network of a wireless carrier network;

translating the 3GPP notification message into a logically equivalent non-3GPP reachability status communication at the translation application, the non-3GPP status communication indicating that the IoT device is unreachable; and sending the non-3GPP reachability status communication to a server of the wireless carrier network to trigger the server to queue one or more communication messages that are destined for the IoT device in a server queue, wherein the server is a Lightweight Machine-to-Machine (LwM2M) server or a Constrained Application Protocol (CoAP) server, and the server queue is an LwM2M server queue or a CoAP server queue.

20. The system of claim 19, wherein the plurality of actions further comprise:

receiving an additional 3GPP notification message that includes an indication of reachability or availability of the IoT device at the translation application;

translating the additional 3GPP notification message into an additional non-3GPP reachability status communication indicating that the IoT device reachable; and sending the additional non-3GPP reachability status communication to the server to trigger the server to release the one or more communication messages from the server queue to the IoT device.

* * * * *